US008918328B2

(12) United States Patent
Plachouras et al.

(10) Patent No.: US 8,918,328 B2
(45) Date of Patent: Dec. 23, 2014

(54) RANKING USING WORD OVERLAP AND CORRELATION FEATURES

(75) Inventors: Vassilis Plachouras, Cattalunya (ES); Vanessa Murdock, Catalunya (ES); Massimiliano Ciaramita, Catalunya (ES)

(73) Assignee: Yahoo! Inc., Sunnyvale, CA (US)

( * ) Notice: Subject to any disclaimer, the term of this patent is extended or adjusted under 35 U.S.C. 154(b) by 1657 days.

(21) Appl. No.: 12/106,230

(22) Filed: Apr. 18, 2008

(65) Prior Publication Data

US 2009/0265230 A1 Oct. 22, 2009

(51) Int. Cl.
*G06Q 30/02* (2012.01)

(52) U.S. Cl.
CPC ............ *G06Q 30/02* (2013.01); *G06Q 30/0256* (2013.01)
USPC ........... 705/14; 705/14.66; 707/706; 707/721

(58) Field of Classification Search
USPC ..................... 705/14.66; 1/1; 707/999.005, 5, 707/E17.022, 730, 999.002, E17.108, 705, 707/722, 999.1, 739; 706/20
See application file for complete search history.

(56) References Cited

U.S. PATENT DOCUMENTS

| 7,752,190 B2* | 7/2010 | Skinner ......................... 707/706 |
| 7,860,859 B2* | 12/2010 | Haugen et al. ................. 707/721 |
| 8,036,937 B2* | 10/2011 | Tang et al. .................. 705/14.46 |
| 2005/0131762 A1* | 6/2005 | Bharat et al. .................... 705/14 |
| 2005/0278357 A1* | 12/2005 | Brown et al. .................. 707/100 |
| 2007/0179930 A1* | 8/2007 | Wang et al. ....................... 707/2 |
| 2009/0319518 A1* | 12/2009 | Koudas et al. .................... 707/5 |

OTHER PUBLICATIONS

Joachims, T., et al., "Accurately Interpreting Clickthrough Data as Implicit Feedback," Proceedings of the 28.sup.th Annual Int'l ACM SIGIR Conference on Research and Development in Information Retrieval, Aug. 15, 2005, pp. 154-161.*
T. Joachims, et al., *Accurately Interpreting Clickthrough Data as Implicit Feedback*, Dept. of Computer Science, Cornell University, NY, pp. 1-8.
V. Murdock, et al., *A Noisy-Channel Approach to Contextual Advertising*, Yahoo! Research—Barcelona, Spain, pp. 21-27.
M. Sahami, et al., *A Web-based Kernel Function for Measuring the Similarity of Short Text Snippets*, Google Inc., pp. 1-10.
J. Carrasco, et al., *Clustering of bipartite advertiser-keyword graph*, Overture Research, Yahoo!, pp. 1-8.
L. Granka, et al., *Eye-Tracking Analysis of User Behavior in WWW Search*, Cornell University, Human-Computer Interaction Group, pp. 1-3.
W. Yih, et al., *Finding Advertising Keywords on Web Pages*, Microsoft Research, pp. 1-10.
R. Jones, et al., *Generating Query Substitutions*, Yahoo! Research, pp. 1-10.
B. Ribeiro-Neto, et al., *Impedance Coupling in Content-targeted Advertising*, Computer Science Department, Federal University of Minas Gerais, Brazil, pp. 1-8.

(Continued)

*Primary Examiner* — Robert Niquette
(74) *Attorney, Agent, or Firm* — Brinks Gilson & Lione

(57) ABSTRACT

A system for and method for ranking results. The system includes a server configured to receive a query and an advertisement engine configured to receive the query from the server. The advertisement engine ranks advertisements based on various features, including at least one word overlap feature and a correlation feature.

15 Claims, 4 Drawing Sheets

(56) References Cited

OTHER PUBLICATIONS

J. Feng, et al., *Implementing Sponsored Search in Web Search Engines: Computational Evaluation of Alternative Mechanisms*, pp. 1-25.

E. Agichtein, et al., *Improving Web Search Ranking by Incorporating User Behavior Information*, Microsoft Research, pp. 1-8.

G. Cauwenberghs, et al., *Incremental and Decremental Support Vector Machine Learning*, pp. 1-7.

M. Collins, et al., *Incremental Parsing with the Perceptron Algorithm*, pp. 1-8.

Y. Freund, et al., *Large Margin Classification Using the Perceptron Algorithm*, Machine Learning, 37(3): 277-296, 1999, pp. 1-19.

A. Lacerda, et al., *Learning to Advertise*, SIGIR '6, Aug. 6-11, 2006, Seattle, Washington, USA, Copyright 2006, ACM 1-59593-369-7/06/0008, pp. 549-556.

C. Burges, et al., *Learning to Rank using Gradient Descent*, Proceedings of the 22$^{nd}$ International Conference on Machine Learning, Bonn, Germany, 2005. Copyright 2005 by the author(s)/owner(s), pp. 1-8.

T. Liu, et al., LETOR: *Benchmark Dataset for Research on Learning to Rank for Information Retrieval*, pp. 1-8.

J. Kivinen, et al., *Online Learning with Kernels*, Research School of Information Sciences and Engineering, Australian National University, pp. 1-7.

T. Joachims, *Optimizing Search Engines using Clickthrough Data*, Cornell University Dept. of Computer Science, pp. 1-10.

G. Xue, et al., *Optimizing Web Search Using Web Click-through Data*, pp. 118-126, This work was conducted while the author was doing internship at Microsoft Research Asia.

W. Zhang, et al., *Query Rewriting using Active Learning for Sponsored Search*, Yahoo!, pp. 1-2.

L. Shen, et al., *Ranking and Reranking with Perceptron*, 2004 Kluwer Academic Publishers, Printed in the Netherlands, pp. 1-26.

M. Ciaramita, et al., *Semantic Associations for Contextual Advertising*, Journal of Electronic Commerce Research, vol. 9, No. 1, 2008, pp. 1-15.

F. Sha, et al., *Shallow Parsing with Conditional Random Fields*, Department of Computer and Information Science University of Pennsylvania, pp. 1-8.

Y. Li, et al., *The Perceptron Algorithm with Uneven Margins*, pp. 1-8.

R. Krovetz, *Viewing Morphology as an Inference Process*, Department of Computer Science, University of Massachusetts, pp. 191-202.

\* cited by examiner

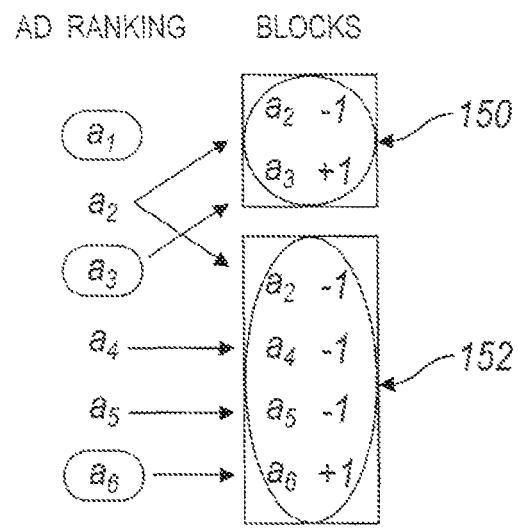
FIG. 4
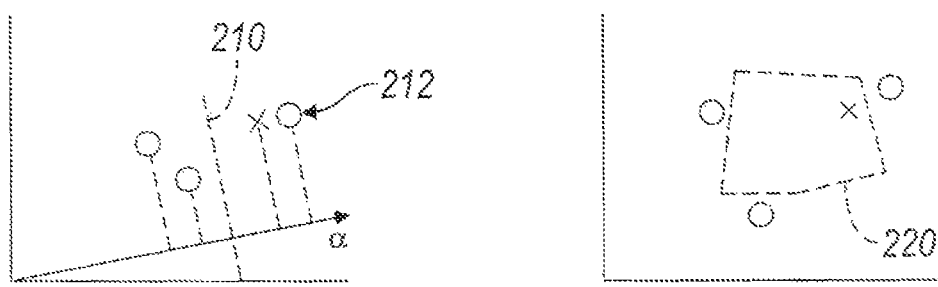
FIG. 5A
FIG. 5B

RANKING USING WORD OVERLAP AND CORRELATION FEATURES

BACKGROUND

Sponsored search advertising can provide a significant amount of revenue for web search engines. Sponsored search advertising generally includes matching advertisements to user queries. Typically, the advertisements appear along with the search results on a web page.

An advertiser registers an ad with the system and may provide an ad title, description, and a landing URL, which corresponds to the web page shown when the user clicks on the ad. The advertiser bids on user query terms. The advertisement may be displayed based on the bidded terms. The ads related to the user query may be shown, and the advertiser pays the bidded amount when there is a click on the advertisement.

In the setting described above, ads that are more likely to be relevant may be presented to users higher in the ranking order. One way to rank ads for a query is to use traditional text similarity metrics, such as cosine similarity. However, traditional text similarity metrics are not reliable, because both the query and the ads contain very little text.

One difficulty in assessing the similarity of an ad to a query is the sparseness of information representing both the query and the ad. Another difficulty is that users click on ads for a wide variety of reasons that are not reflected in the similarity of an ad to a query.

In view of the above, it is apparent that there exists a need for an improved system and method to rank advertisements in the context of sponsored search.

SUMMARY

In satisfying the above need, as well as overcoming the drawbacks and other limitations of the related art, the disclosed system ranks sponsored search results using word overlap and correlation features.

The system includes a server configured to receive a query and an advertisement engine configured to receive the query from the server. The advertisement engine ranks advertisements based on various features. To facilitate optimal performance, the features include at least one word overlap feature and a correlation feature.

In one aspect of the system, four word overlap features can be considered. The first word overlap feature indicates whether all terms of the query are found in the advertisement. The second word overlap feature indicates whether some of the terms of the query are found in the advertisement. The third word overlap feature indicates whether none of the terms of the query are found in the advertisement, while the fourth word overlap feature indicates a percentage of the terms of the query that are found in the advertisement.

In another aspect of the system, the correlation feature may be a pointwise mutual information statistic, a Chi-squared statistic, or both. In addition, evaluation of the correlation feature and the word overlap features may be weighted based on a learning model.

Other systems, methods, features and advantages will be, or will become, apparent to one with skill in the art upon examination of the following figures and detailed description. It is intended that all such additional systems, methods, features and advantages be included within this description, be within the scope of the application, and be protected by the following claims and be defined by the following claims. Further aspects and advantages are discussed below in conjunction with the description.

BRIEF DESCRIPTION OF THE DRAWINGS

FIG. 4 is a schematic of how blocks are generated from clicked and non-clicked ads for a query;

FIG. 5*a* is a diagram illustrating a linear decision boundary; and

FIG. 5*b* is a diagram illustrating non-linear decision boundaries.

DETAILED DESCRIPTION

Figure 1:
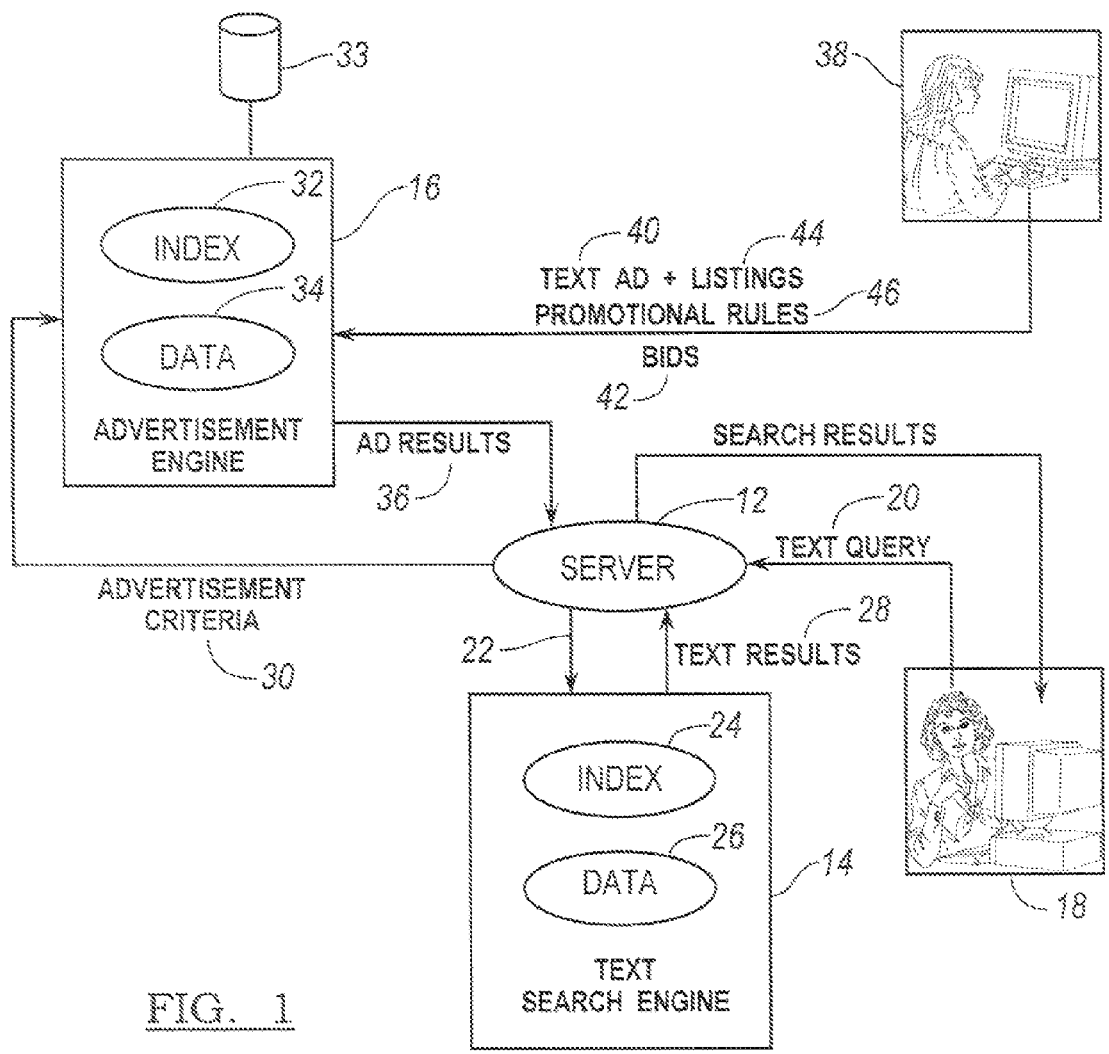
FIG. 1 is a schematic view of a system for optimizing machine-learned ranking functions based on click data.

In FIG. 1, a system 10 includes a server 12 and an advertisement engine 16. The server 12, for example a web server, is in communication with a user system 18 over a network connection, for example over an Internet connection. In the case of a web search page, the server 12 is configured to receive a text query 20 to initiate a web page search. The text query 20 may be a simple text string including one or more keywords that identify the subject matter for which the user wishes to search. Upon selection of a search button, the text query 20 may be sent from the user system 18 to the server 12. The text query 20 also referred to as a raw user query, may be simply a list of terms known as keywords.

Figure 2:
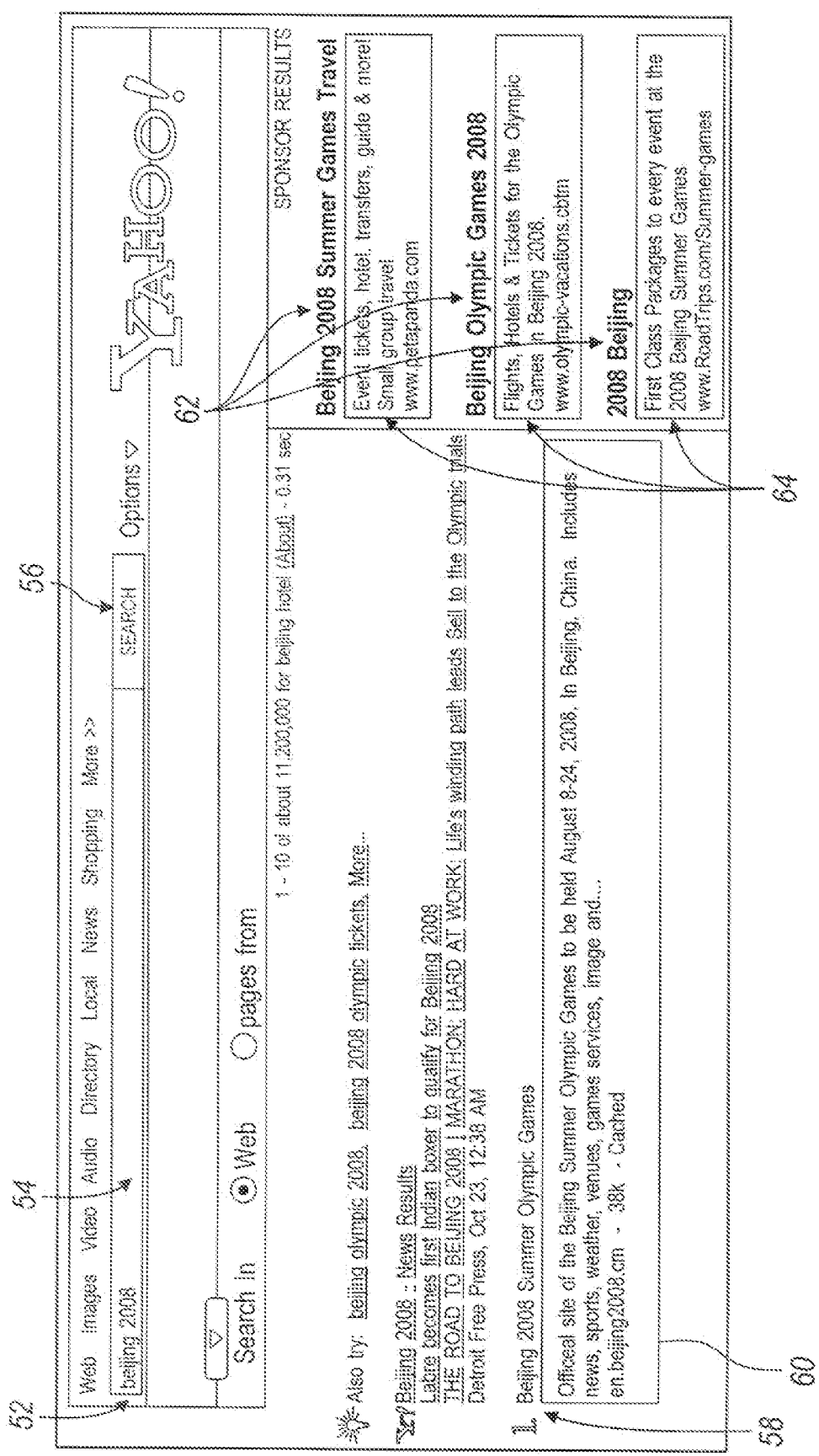
FIG. 2 is an example of a search engine results page.

An example of a sponsored search page is provided in FIG. 2. The query string 52 is entered into a query text box 54. The search button 56 may be selected to initiate the sponsored search. Generally, the relevant search results are provided on the left of the web page and include a title 58 and snippets of text, denoted by block 60, providing information about the item. Similarly, a ranked list of advertisements is generated including a title 62 for each advertisement and snippets of text, denoted by blocks 64, providing information about the advertisement.

The server 12 provides the text query 20 to the text search engine 14, as denoted by line 22. The text search engine 14 includes an index module 24 and the data module 26. The text search engine 14 compares the query 20 to information in the index module 24 according to the method described later to determine the relevance of each index entry relative to the query 20 provided from the server 12. The text search engine 14 then generates text search results by ordering the index entries into a list from the highest relevance entries to the lowest relevance entries. The text search engine 14 may then access data entries from the data module 26 that correspond to each index entry in the list. Accordingly, the text search engine 14 may generate text search results 28 by merging the corresponding data entries with a list of index entries. The text search results 28 are then provided to the server 12 to be formatted and displayed to the user.

The server 12 is also in communication with the advertisement engine 16 allowing the server 12 to tightly integrate advertisements with the content of the page and, more specifically, the user query and search results in the case of a web search page. To more effectively select appropriate advertisements that match the user's interest and query intent, the server 12 may be configured to further analyze the text query 20 and generate a more sophisticated set of advertisement criteria 30 or use the text query 20 directly. Alternatively, if the web page is not a web search page, the page content may be analyzed to determine the user's interest to generate the advertisement criteria 30 or text query 20.

In FIG. 1, the advertisement criteria 30 is provided to the advertisement engine 16. The advertisement engine 16 includes an index module 32 and a data module 34. The advertisement engine 16 performs an ad matching algorithm to identify advertisements that match the user's interest and the query intent. The advertisement engine 16 may be in communication with a computer readable medium 33 for storing instructions implementing the ad matching algorithm or other described functions. The advertisement engine 16 compares the advertisement criteria 30 to information in the index module 32 to determine the relevance of each index entry relative to the advertisement criteria 30 provided from the server 12. The scoring of the index entries may be based on the method described below and may consider also advertisement criteria, as well as the bids and listings of the advertisement. The bids are requests from an advertiser to place an advertisement. Each bid may have an associated bid price for each selected domain, keyword, or combination relating to the price the advertiser will pay to have the advertisement displayed. Listings provide additional specific information about the products or services being offered by the advertiser. The listing information may be compared with other advertisement criteria to match the advertisement with the query. An advertiser system 38 allows advertisers to edit ad text 40, bids 42, listings 44, and rules 46. The ad text 40 may include fields that incorporate, domain, general predicate, domain specific predicate, bid, listing or promotional rule information into the ad text.

The advertisement engine 16 may then generate advertisement search results 36 by ordering the index entries into a list from the highest relevance entries to the lowest relevance entries. The advertisement engine 16 may then access data entries from the data module 34 that correspond to each index entry in the list from the index module 32. Accordingly, the advertisement engine 16 may generate advertisement results 36 by merging the corresponding data entries with a list of index entries. The advertisement results 36 are then provided to the server 12. The advertisement results 36 may be provided to the user system 18 for display to the user.

The system 10 may implement an online learning model in one or both of the advertisement engine 16 and the text search engine 14. Each online learning model may operate in three modes for training, normal run, and evaluation. In each mode, a machine learned ranking function based on click data is utilized. The click data may be obtained from the server 12 through a stream, without the need of unbiasing the click data. Exploratory results on actual click logs have shown that this approach produces improved results over known methods. In addition, the system 10 can also operate on editorial data, without the cost of producing the annotated data. Such a method thus has the potential to build more robust, adaptive and up-to-date ranking systems.

The system may utilize online learning with the perceptron algorithm for learning the weights of a set of features in order to rank ads for a given query. A perceptron algorithm may be preferred, however, any machine learning framework, such as SVM, may be used. Moreover, the ground truth used during the learning of the weights for the features can be based on either editorial assessments of query-ad relevance or on implicit user feedback in the form of clicks. The introduced features estimate the similarity between queries and ads and they are described in detail below. Particularly, good results have been achieved utilizing word overlap features together with correlation based features.

The word overlap functions may directly identify terms in the query to the same terms in the advertisements. In one example, the system calculates four features that assess the degree of word overlap between the query and the ad materials. The first feature F1 has a value of one if all terms t of query q are present in the ad a, otherwise it has a value of zero. The second feature F2 has a value of one if some of the terms t of query q are present in the ad a, otherwise it has a value of zero. The third feature F3 has a value of one if none of the terms t in query q are present in the ad a. The fourth feature F4 is the percentage of the query terms that have an exact match in the ad materials. As such, the fourth feature F4 takes values between zero and one. Prior to computing the word overlap features, the text may be pre-processed to provide text normalization.

In addition, the system may calculate correlation features to be used with the learning model. Queries and ads are both short snippets of text, which may not have a high vocabulary overlap, if any at all. To address this issue, two features are introduced based on measuring the statistical association of terms from an external corpus.

One measure of association between terms is point-wise mutual information (PMI). PMI can be computed between terms of a query q and bidded terms of an ad. PMI is based on co-occurrence information, which is obtained from a past query log: PMI ca be calculated according to the equation: $PMI(t_1, t_2) = \log(P(t_1)P(t_2)/P(t_1,t_2))$.

In the above equation, $t_1$ is a term from q, and $t_2$ is a bidded term from the ad. P(t) is the probability that term t appears in the query log, and $P(t_1, t_2)$ is the probability that terms $t_1$ and $t_2$ occur in the same query.

The pairs of $t_1$ and $t_2$ are formed by extracting the query terms and the bidded terms of the ad. Pairs of terms consisting of distinct terms with at least one letter are considered. For each pair q and a two features may be used: the average PMI and the maximum PMI, denoted by AvePMI and MaxPMI, respectively. However, any other function of the PMI of a pair of terms can be used as a feature as well.

Another measure of association between terms is the Chi-square statistic, which is computed with respect to the occurrence in a query log of terms from a query and the bidded terms of an ad, the Chi-square statistic can be computed according to the relationship: $\text{chi\_square} = |L| \, (o_{11}*o_{22} - o_{12}o_{21})^2 / ((o_{11}+o_{12})*(o_{11}+o_{21})*(o_{12}+o_{22})*(o_{21}+o_{22}))$.

In the above equation, $o_{ij}$ stands for the number of queries in a past query log for which the corresponding condition in Table 1 holds. Table 1 effectively provides the definition of $o_{ij}$ for the calculation of the Chi-square statistic. For example $o_{11}$ stands for the number of queries in the log, which contain both terms $t_1$ and $t_2$. Similarly, $o_{12}$ stands for the number of queries in the log, in which term $t_2$ occurs but term $t_1$ does not. $|L|$ is the number of queries in the query log.

TABLE 1

|  | $t_1$ | $\neg t_1$ |
|---|---|---|
| $t_2$ | $o_{11}$ | $o_{12}$ |
| $\neg t_2$ | $o_{21}$ | $o_{22}$ |

The Chi-square statistic is computed for the pairs of terms formed by each of the query terms and each of the bidded terms of the ad. Then, for each pair of query and ad, the feature value corresponds to the count of the number of term pairs that have a Chi-square value higher than 95% of all the computed Chi-square values.

The system may implement a machine learning framework to facilitate weighting of the features. The machine learning framework may use on online learning and the perceptron algorithm to rank sponsored search results. The machine learning framework employs features computed over pairs of queries and ads. The features address the problem of word overlap between the query and the ad in two distinct ways. First, they reinforce the pairs of queries and ads that have a high degree of word overlap. Second, they boost pairs of queries and ads that do not have significant word overlap, but share related vocabulary. Note that the features can be used in a system that employs different machine learning frameworks, such as Support Vector Machines.

The system learns the weights of a set of features in order to rank ads for a given query. While the perceptron algorithm may be preferable, other machine learning framework may be used, such as SVM. Moreover, the ground truth used during the learning of the weights for the features can be based on either editorial assessments of query-ad relevance or on implicit user feedback in the form of clicks. The introduced features estimate the similarity between queries and ads.

Determining the weights for each feature can be challenging. For example, there is a strong positional bias to user clicks. Users are much more likely to click on items at the top of a ranked list of search results than items lower in the ranking. This makes using the click data to learn a ranking function over the ads and to evaluate the system more difficult. Specifically, user clicks are not an indication of absolute relevance. Rather, the user click only indicates that the items viewed above the current position that were not clicked are less relevant than the item clicked. This means positive and negative examples can be extracted from query logs in a meaningful way. As such, a training set can be created from the query logs of a real sponsored search system. This type of data can be also used directly for evaluating a learning model. Generally, prior systems relied on editorial data for evaluation.

Consistent results have been obtained using this methodology across different ranking methods and different feature sets. Three learning methods of increasing complexity may be used based on the perceptron algorithm: a binary linear classifier, a linear ranking model and an artificial neural net. Specifically, online learning methods may be useful which are able to learn from large amounts of data, or from a stream of incoming feedback from query logs. Generally, tests have indicated that accuracy increases with the complexity of the model.

Several classes of features have been investigated for content match, the task of ranking ads with respect to the context of a web page, rather than a query. The cosine similarity between a query and ad may be used as a baseline. Then, the ad is decomposed and the similarity of individual components of the ad and the query are used as features. Next, a class of language-independent, knowledge free, features are evaluated based on the distributional similarity of pair words which have been used successfully in content match, and can be extracted from any text collection or query log. These features measure the similarity between two texts independently of exact matches at the string level and are meant to capture indirect semantic associations. In content match, there are many words that can be extracted from a web page to compute such features, while in sponsored search there are only the terms in the query. Across all learning methods these features produce the best results.

The methods described herein for weighting the features may use click-data directly for learning and evaluation purposes. Using click data is a desirable property in the context of large scale systems, that otherwise have to rely exclusively on editorial data, or carry out noisy estimations of click-through rates. The test results verify empirically that different methods of increasing complexity can be applied to the task and generate consistent results. This is important because it supports the hypothesis that the evaluation is consistent across different methods. On the learning side, it also shows that taking into account pairwise information in training is beneficial in machine-learned ranking, even in noisy settings. Finally, the test results provide empirical evidence on the utility of a class of simple features for ranking based on lexical similarity measures, also in the task of query-based ranking, and thus possibly also in document retrieval and search in general.

Figure 3:
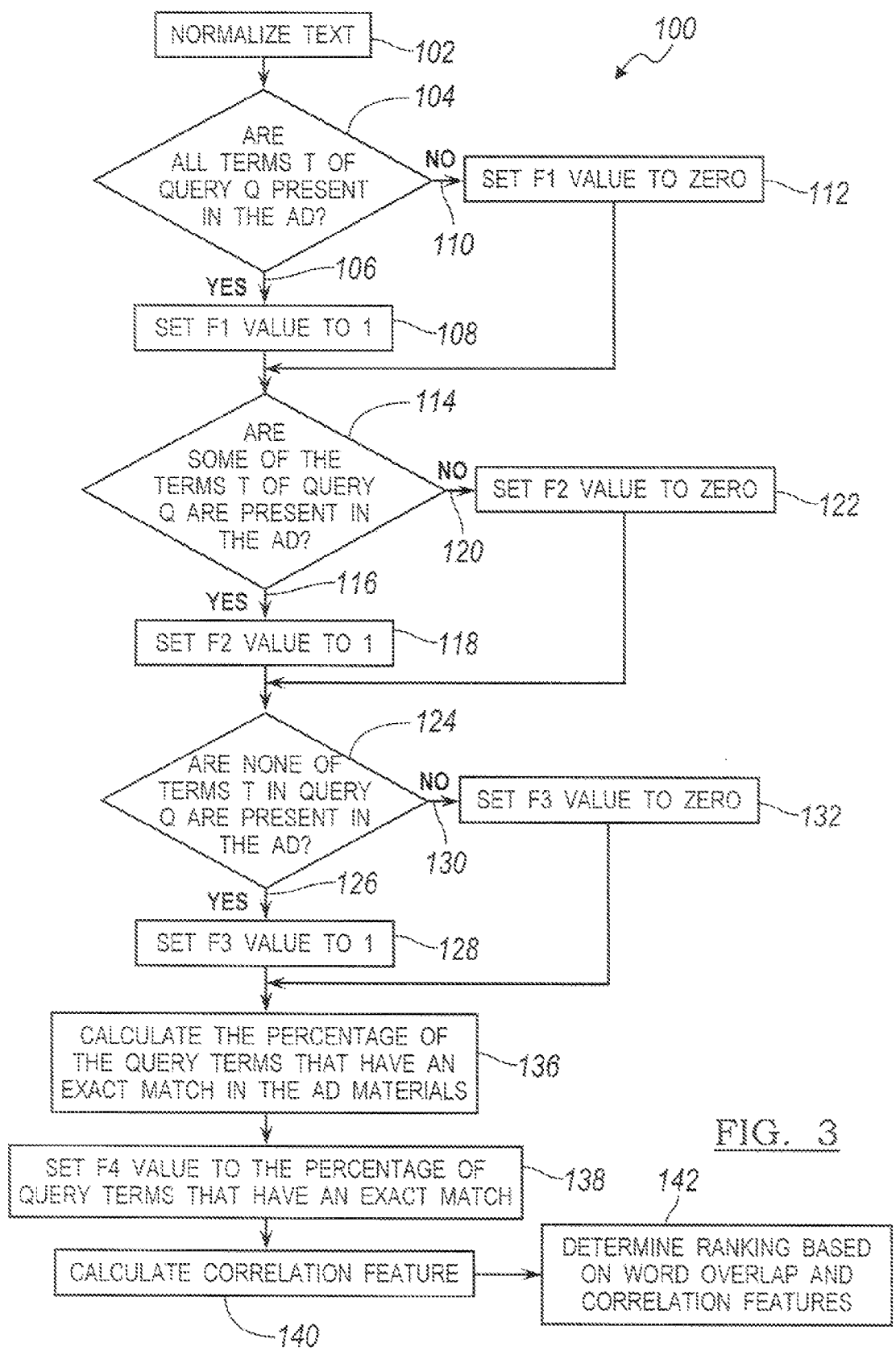
FIG. 3 is a flowchart illustrating a method of ranking based on word overlap and correlation features.

Referring to FIG. 3 a flowchart is provided for illustrating a method 100 for ranking using the features described above. The method 100 starts in block 102, where the text of the query and ads are normalized, for example by removing case. In block 104, the system determines if all terms of the query are present in the ad. If all terms of the query are present in the ad, the method 100 follows line 106 to block 108 where the first feature value is set to 1. If all terms of the query are not present in the ad, the method 100 follows line 110 to block 112. In block 112, the value of the first feature is set to zero and the method 100 progresses to block 114.

In block 114, the system determines if some of the terms of the query are present in the ad. If some of the terms of the query are present in the ad, the method 100 follows line 116 to block 118 where the second feature value is set to 1. If some of the terms of the query are not present in the ad, the method 100 follows line 120 to block 122. In block 122, the value of the second feature is set to zero and the method 100 progresses to block 124.

In block 124, the system determines if none of the terms of the query are present in the ad. If none of the terms of the query are present in the ad, the method 100 follows line 126 to block 128 where the third feature value is set to 1. Otherwise, the method 100 follows line 130 to block 132. In block 132, the value of the third feature is set to zero and the method 100 progresses to block 136.

In block 136, the percentage of the query terms that have an exact match in the ad materials is calculated. In block 138, the value of the fourth feature is set to the percentage of query terms that have an exact match in the ad materials. In block 140, the system calculates a correlation feature for the ranking algorithm. As described above, the correlation feature may be a Chi-squared statistic or a point-wise mutual information statistic (i.e. AvgPMI and/or MaxPMI). The above features can be calculated during run mode, training mode, or evaluation mode of the system. In block 142, the system then determines ranking based on the word overlap and the correlation features. Although clearly, additional features such as cosine similarity may also be considered.

The system using the described features was tested on a collection of Yahoo!® Sponsored Search query logs. The proposed features improve the quality of the ranking of sponsored search results compared to a baseline ranking function utilizing the cosine similarity between each of the ads description, title, and bidded terms. The proposed features do not require any external corpus of data that is not readily available to Yahoo!®. In addition, they are language independent and they can be applied to any of the international markets.

Employing user clicks to train and to evaluate a sponsored search system is an excellent solution, since the goal in sponsored search is maximizing the number of clicks. However, user clicks generally cannot be used in a straight-forward manner because they have a strong positional bias, and they only provide a relative indication of relevance. The strong positional bias is because highly ranked results or ads may be clicked based of their rank position and not their relevance. For example, a user may click on the top ranked ad and then click on the third ad in the ranking, even if the third ad may be more relevant to his query. The reason for this bias is that users are likely to scan sequentially the ranked list of items and may click on an item before, or without, scanning the whole list.

To investigate how to employ user clicks to train and evaluate a sponsored search system, a set of queries and the corresponding ads were collected from the logs of the Yahoo!® web search engine. The corresponding ads are ads that had been shown with the set of queries on the right-hand side of the search engine results page. The queries were sampled until a sufficiently large number of distinct clicked ads were collected. Queries with three or more query terms were sampled because longer queries are more likely to lead to higher conversion rates. In other words, users issuing longer queries are more likely to visit a web site and perform a transaction. In addition, only one click for a query-ad pair were considered from one user per day.

To facilitate training a conservative assumption was made that a click can only serve as an indication that an ad is more relevant than the ads ranked higher but not clicked, but not as an absolute indication of the ad relevance. In this setting, the clicks on the top ranked ad do not carry any information, because the top ranked ad cannot be ranked any higher. In other words, there is no discriminative pairwise information. Hence, such clicks were not considered in the experiments. For each clicked ad, a block was created which consists of the clicked ad and the non-clicked ads that ranked higher, for a total of 123,798 blocks. In each block, a score of "+1" was assigned to the clicked ad and "−1" to the ads that were ranked higher but were not clicked.

FIG. 4 shows an example of the score assignment process. On the left-hand side of FIG. 4, the ranking of six ads for a query are shown. The ellipsis around ads $a_1$, $a_3$ and $a_5$ denote that these ads were clicked by the user who submitted the query. The "gold-standard" blocks of ads, shown on the right-hand side of FIG. 4, are generated in the following way. First, the click on ad $a_1$ was ignored since this ad was already ranked first and it was clicked. Then, a first block 150 of ads is formed with $a_2$ and $a_3$, assigning scores of "−1" and "+1", respectively. Next, a second block 160 of ads is formed consisting of $a_2$, $a_4$, $a_5$ with scores "−1" and $a_6$ with score "+1".

Learning with clicks can involve arbitrarily large amounts of data. In one implementation, learning can be performed from a continuous stream of data. Online learning algorithms are the most natural choice for this type of task, since the data need not be considered (or stored in memory) all at once. Rather, each pattern is used for learning in isolation. As a general online learning framework, the perceptron algorithm may be a chosen and was used in the testing described. The perceptron algorithm was invented by Frank Rosemblatt in 1958, and was initially criticized because of its inability to solve non-linear problems. In fact, the perceptron algorithm, like support vector machines (SVM) and other methods, can learn non-linear models by means of kernel functions in dual algorithms, or by means of higher-order feature mappings in the primal form, or even by means of multilayer architectures.

The perceptron algorithm has received much attention in recent years for its simplicity and flexibility. In particular, the perceptron algorithm has been popular in natural language processing, where it has been successfully applied to several tasks such as syntactic parsing, tagging, information extraction and re-ranking. The perceptron algorithm may be preferred over other popular methods, such as SVM, for which incremental formulations have been proposed, because the accuracy of well-designed perceptrons (i.e., including regularization, margin functions, etc.) often perform as well as more complex methods at a smaller computational cost. Moreover, the simplicity of the perceptron algorithm allows easy customization, which can be important in large scale settings. One perceptron model was benchmarked on a ranking task and yielded results comparable to more complex SVM and Boosting methods.

Three primary approaches are provided for learning rank ads based on click data: classification, ranking, and non-linear regression. The general setting involves the following elements. A pattern is a vector of features extracted from an ad-query pair $(a, q)$, $x \in \mathbb{R}^d$. Each pattern $x_i$ is associated with a response value $y_i \in \{-1, +1\}$. In classification, a vector for a pair which has not been clicked is associated with −1, also referred to as class $y_o$. Similarly, a vector for a pair which has been clicked is associated with +1, also referred to as class $y_1$. The goal of learning is to find a set of parameters (weights) $\alpha$ which are used to assign a score $F(x_i; \alpha)$ to patterns such that $F(x_i; \alpha)$ is close to the actual value $y_i$. In particular, the clicked ad may be predicted for a block of ads to evaluate performance of the model.

In a classification framework the goal is to learn a function which is able to accurately assign a pattern to either the clicked or not-clicked class. Patterns in the data are used independently of one another in training and the classifier simply finds a weight vector which assigns each pattern to the correct class. After learning, the classifier can be used to identify the most likely clickable pattern in a block.

The basic classifier is a binary perceptron algorithm. The basic model may be extended by averaging and adding an uneven margin function. Averaging is a method for regularizing the classifier by using the average weight vector of all perceptron models posited during training. The uneven margin function is a method for learning a classifier with large margins for cases in which the distribution of classes is unbalanced. Since non-clicked ads are more numerous than clicked ads, the learning task is unbalanced and the uneven margin function guides learning towards achieving a larger margin on the positive class. The binary perceptron uses the sign function as a discriminant:

$$F(x;\alpha) = \mathrm{Sgn}(\langle x, \alpha \rangle) \quad (1)$$

The $\alpha$ variable is learned from the training data. In one example, the model has two adjustable parameters, the first is the number of instances T to use in training, or the number of passes (epochs) over the training data. The second concerns a constant $\tau_1$ of the uneven margin function that is used in training to define a margin on the positive class. While training, an error is made on a positive instance of x, if $F(x; \alpha) \le \tau_1$. In addition, the parameter on the negative class $\tau_0 = 0$ and is effectively ignored. The learning rule is:

$$\alpha^{t+1} = \alpha^t + y_i x_i \quad (2)$$

The ranking function defined on the binary classifier is simply the inner product between the pattern and the weight vector:

$$S_{opm} = \langle x_i, \alpha \rangle \quad (3)$$

In evaluation, $S_{opm}$ is used to rank ads in each block. Another method of modeling click feedback is by using a ranking algorithm. The general intuition is to exploit the pairwise preferences induced from the data by training on pairs of patterns, rather than independently on each pattern.

Let Rb be a set of pairs of patterns for a block b, such that $(x_i, x_j) \in R_b \Leftrightarrow r(y_i) < r(y_j)$, where $r(y_i)$ is the rank of $x_i$ in b. For example, in this case, either $y_i = 1$ and $r(y_i) = 1$, or $y_i = -1$ and $r(yi) = 2$.

Given a weight vector $\alpha$, the score for a pattern x is again the inner product between the pattern and the weight vector:

$$S_{rnk} = \langle x_1 \alpha \rangle \quad (4)$$

However, the error function depends on pairwise scores. In training, for each pair $(x_i, x_j) \in C\ R_b$, the score $Srnk(x_i - x_j)$ is computed. Given a margin function g and a positive learning margin $\tau$, if $Srnk(x_i - x_j) \leq g(r(y_i), r(y_j))\tau$, an update is made as follows:

$$\alpha^{t+1} = \alpha^t + (x_1 - x_i)\tau \quad (5)$$

In particular, because the discriminant function is an inner product, $S_{mk}(x_i - x_j) = S_{mk}(x_i) - S_{mk}(x_j)$. By default $$g(i, j) = \left(\frac{1}{i} - \frac{1}{j}\right)$$

is used as a margin function. Although there are only two possible ranks in our setting, ideally training on pairs provides more information than training on patterns in isolation. For regularization purposes, averaging is applied also to the ranking perceptron.

One possible drawback of the previous methods is that they are limited to learning linear solutions. To improve the expressive power of the proposed ranking function, within the online perceptron approach, multilayer models may be applied. The topology of multilayer perceptrons include at least one non-linear activation layer between the input and the output layers. Multi-layer networks with sigmoidal non-linear layers can generate arbitrarily complex contiguous decision boundaries, as shown in FIGS. 5a and 5b. FIG. 5a illustrates an example of learning decision boundaries based on a linear model. FIG. 5b illustrates an example of learning decision boundaries based on a non-linear model such as multi-layer regression. In both FIGS. 5a and 5b, x denotes positive (clicked) patterns while circles denote negative (non-clicked) patterns. The linear model utilizes a type of threshold as indicated by line 210. The linear model may classify some of the patterns correctly but may misclassify certain indicators with complex relationships, such as the negative classifier denoted by arrow 212. Alternatively, non-linear models can find complex decision boundaries, as denoted by line 220, to solve non-linearly separable cases.

Multi-layer networks have been used successfully in several tasks, including learning to rank. The multilayer perceptron can be fully connected three-layer network with the following structure:

1. Input layer: d units $x_1, x_2, \ldots, x_d$ +a constant input $x_o = 1$
2. Hidden layer: $n_H$ units $w_1, w_2, \ldots, w_{nH}$ +a constant weight $w_o = 1$
3. Output layer: one unit z
4. Weight vector: $\alpha^2 \in IR^{nH}$ +a bias unit $\alpha_0^2$
5. Weight matrix: $\alpha^1 \in IR^{d \times nH}$ +a bias vector $\alpha_0^1 \in IR^{nH}$ The score $S_{mlp}(x)$ of a pattern x is computed with a feedforward pass:

$$S_{mlp}(x) = \sum_{j=1}^{nH} \alpha_j^2 w_j + \alpha_0^2 = \langle \alpha^2, w \rangle \quad (6)$$

where $w_j = f(net_j)$, and $$net_j = \sum_{i=1}^{d} \alpha_{ij}^1 x_i + \alpha_0^1 = \langle \alpha_j^1, x \rangle \quad (7)$$

The activation function f(net) of the hidden unit is a sigmoid:

$$f(net) = \frac{1}{1 + \exp^{-\alpha net}} \quad (8)$$

Supervised training begins with an untrained network whose parameters are initialized at random. Training is carried out with back propagation. As such, an input pattern $x_i$ is selected and its score is computed with a feedforward pass. Then the score is compared to the true value $y_i$. The parameters are, thereafter, adjusted to bring the score closer to the actual value of the input pattern. The error E on a pattern $x_i$ is the squared difference between the guessed score $S_{mip}(x_i)$ and the actual value $y_i$ of $x_i$, or for brevity $(y_i - s_i)$, $$E = \frac{1}{2}(y_i - s_i)^2.$$

After each iteration t, $\alpha$ is updated component-wise to $\alpha^{t+1}$ by taking a step in weight space which lowers the error function:

$$\alpha^{t+1} = \alpha^t + \Delta\alpha^t \quad (9)$$
$$= \alpha^t + \eta \frac{\partial E}{\partial \alpha^t} \alpha^t$$

where $\eta$ is the learning rate, which affects the magnitude, or speed, of the changes in weight space.

The weight update for the hidden-to-output weights is:

$$\Delta\alpha_i^2 = \eta \delta w_i \quad (10)$$

where $\delta = (y_i - z_i)$.

The learning rule for the input-to-hidden weights is:

$$\Delta\alpha_{ij}^1 = \eta x_i f'(net_j) \alpha_{ij}^1 \delta. \quad (11)$$

where f' is the derivative of the non-linear activation function.

An estimate was determined empirically for the accuracy of the methods implemented. On all evaluation metrics the ranking perceptron achieves scores comparable to SVM on the OHSUMED and TD2003 datasets, and comparable to RankBoost on the TD2004 dataset. The multilayer perceptron outperforms the ranking perceptron on exploratory runs, but extensive comparisons were not carried out in this context.

A range of features, from simple world overlap and textual similarity features to statistical association between terms from the query and the ads, are used for learning a ranking models. In the implementation described above, four features can be computed that assess the degree of overlap between the query and the ad materials. The first feature has a value of one if all of the query terms are present in the ad:

if $(\forall t \in q)t \in a$, $F_1=1$, and 0 otherwise. (12)

The second feature has a value of one if some of the query terms are present in the ad:

if $\exists t \in q$ such that $t \in a$, $F_2=1$, and 0 otherwise. (13)

The third feature has a value of one if none of the query terms are present in the ad:

if $\neg t \in q$ such that $t \in a$, $F_3=1$, and 0 otherwise. (14)

The fourth feature is the percentage of the query terms that have an exact match in the ad materials.

Prior to computing the features, both the query and the ad can be normalized for case. For the purpose of word overlap, stemming and stopping can be done less aggressively than with functions that are smoothed. As such, a Krovetz stemmer can be used and a strategy may be implemented where only single characters are removed.

Cosine similarity may also be used as a feature for the online learning model. The cosine similarity feature sim(q, a) is computed between the query q and the ad a as follows:

$$sim(q, a) = \frac{\sum_{t \in q \cap a} w_{qt} w_{at}}{\sqrt{\sum_{t \in q} w_{qt}^2} \sqrt{\sum_{t \in a} w_{at}^2}} \quad (15)$$

where the weight $w_t$ of a term in q or a corresponds to the tf–idf weight:

$$w_t = tf \cdot \log_2 \frac{N+1}{n_i + 0.5} \quad (16)$$

where tf is the frequency of a term in q or in α. When considering queries q, tf is expected to be uniformly distributed with one being the most likely value, because terms are not likely to be repeated in queries. In addition, N corresponds to the total number of available ads and nt corresponds to the number of ads in which term t occurs.

The tf–idf weight $w_{at}$ of term t in a is computed in the same way. The cosine similarity between q and each of the fields of the ads may also be computed, that is, the ad title $a_t$, the ad description ad, and its bidded terms $a_b$. In all cases, a stemming algorithm has been applied and stop words have been removed.

Cosine similarity has been used effectively for ranking ads to place on web pages in the setting of contextual advertising. A difference with the current method is that in the case of contextual advertising, the cosine similarity is computed between the web page and ad. While there are more complex similarity functions that have been developed and applied for the case of computing the similarity between short snippets of text, cosine similarity is used because it is parameter free and inexpensive to compute. Queries and ads are both short snippets of text, which may not have a high vocabulary overlap. To address this issue, two features are considered based on measuring the statistical association of terms from an external corpus.

Various correlation algorithms may also be used as a feature for the online learning model. One measure of association between terms is pointwise mutual information (PMI). PMI is computed between terms of a query q and the bidded terms of an ad a. PMI is based on co-occurrence information, which is obtained from a set of queries submitted to the Yahoo! search engine:

$$PMI(t_1, t_2) = \log_2 \frac{P(t_1, t_2)}{P(t_1)P(t_2)} \quad (17)$$

where $t_1$ is a term from q, and $t_2$ is a bidded term from the ad a. P(t) is the probability that term t appears in the query log, and $P(t_1, t_2)$ is the probability that terms $t_1$ and $t_2$ occur in the same query.

The pairs of $t_1$ and $t_2$ are formed by extracting the query terms and the bidded terms of the ad. Only pairs of terms consisting of distinct terms with at least one letter are considered. For each pair (q, a) two features are used: the average PMI and the maximum PMI, denoted by AvePMI and MaxPMI, respectively.

Another measure of association between terms is the $x^2$ statistic, which is computed with respect to the occurrence in a query log of terms from a query, and the bidded terms of an ad:

$$x^2 = \frac{|L|(o_{11}o_{22} - o_{12}o_{21})^2}{(o_{11} + o_{12})(o_{11} + o_{21})(o_{12} + o_{22})(o_{21} + o_{22})} \quad (18)$$

where |L| is the number of queries in the query log, and $o_{11}$ are defined in Table 1.

For example, $o_{11}$ stands for the number of queries in the log, which contain both terms $t_1$ and $t_2$. Similarly, $o_{12}$ stands for the number of queries in the log, in which term $t_2$ occurs but term $t_1$ does not. The $X^2$ statistic is computed for the same pairs of terms on which the PMI features are computed. Then, for each query-ad pair, the number of term pairs are counted that have a $X^2$ higher than 95% of all the computed $x_t$ values.

An overview of the features used is shown in Table 2.

TABLE 2

| Feature Name | Abbrev. | Description |
| --- | --- | --- |
| | | Word Overlap Features |
| NoKey | O | 1 if no query term is present in the ad materials; 0 otherwise |
| SomeKey | | 1 if at least one query term is present in the ad materials; 0 otherwise |
| AllKey | | 1 if every query term is present in the ad materials; 0 otherwise |
| Percent Key | | The number of query terms present in the ad materials divided by the number of query terms |
| | | Cosine Similarity Features |
| Ad | B | The cosine similarity between the query and the ad materials (baseline) |

TABLE 2-continued

| Feature Name | Abbrev. | Description |
|---|---|---|
| Title | F | The cosine similarity between the query and the ad title |
| Description | | The cosine similarity between the query and the ad description |
| Bidterm | | The cosine similarity between the query and the bidded terms |
| | | Correlation Features |
| AvePMI | P | The average pointwise mutual information between terms in the query and terms in the ad |
| MaxPMI | | The maximum pointwise mutual information between terms it the query and terms in the ad |
| CSQ | C | Number of query-ad term pairs that have $x^2$ statistic in the top 5% of computed $x^2$ values. |

All feature values may be normalized across the entire dataset with the z-score, in order to have 0 mean and unit standard deviation. As such, each feature $x_i$ can be normalized as:

$$z = \frac{x^i - \mu_i}{\sigma_i} \quad (19)$$

In addition, each data vector can be augmented with a bias feature which has a value of one for every example, and serves as a prior on the response variable.

For testing, the dataset was split into 1 training set, 5 development sets and 5 test sets, so that all the blocks for a given query are in the same set. The exact number of blocks for each of the development and test sets is given in Table 3. The training set consists of a total of 109,560 blocks.

TABLE 3

| Part | Development size | Test size |
|---|---|---|
| 1 | 1358 | 1445 |
| 2 | 1517 | 1369 |
| 3 | 1400 | 1488 |
| 4 | 1408 | 1514 |
| 5 | 1410 | 1329 |

A ranking algorithm produced a score for each query-ad pair in a block. The ads were ranked according to this score. Because of the way the data was constructed and to account for the relative position of clicks, each block has only one click associated with it. For this reason, the precision at rank one and the mean reciprocal rank are evaluated. The precision at rank one indicates how many clicked ads were placed in the first position by the ranker. The mean reciprocal rank indicates the average rank of the first clicked ad in the output of the ranker. The mean reciprocal rank is computed as:

$$MRR = \frac{1}{n}\sum_{i=1}^{n} \frac{1}{rank_i} \quad (20)$$

where $rank_i$ is the ad at rank i was clicked, and zero otherwise, k is the number of ads placed in a block, and n is the total number of blocks. The MRR score gives an indication of how far on average a user would have to look through the ranked list before clicking on an ad.

All adjustable parameters of the learning models were fixed on the development datasets. The best values were selected by monitoring the average accuracy over the 5 development folds, the optimal values on development were used on the evaluation set. All models were trained with a stochastic protocol, choosing a training instance at random without replacement: a block for the ranking case, a single pattern for the classification and multilayer models.

In the classification case, the parameters T and τ were set. Three values for $\tau_i$, (1, 10 and 100) were evaluated, and 100 was found to give the best results. As for the number of iterations, all the models (not only in classification) tended to converge quickly, rarely requiring more than 20 iterations to find the best results; on average T≈10.

In the ranking model, the positive learning margin τ was optimized, in addition to the number of iterations T. The best results were around the value τ=1 which was used in all experiments with ranking perceptron. The best number of iterations was achieved with T≈5.

The multilayer model has a number of adjustable parameters, some of the parameters were kept with default values; e.g., the momentum, m=0.9, and sigmoid, a=1.716. The network weights for the hidden-to-output units were initialized uniformly at random in the interval $$-\frac{1}{\sqrt{(nH)}} \langle \alpha_i^2 \langle \frac{1}{\sqrt{(nH)}}.$$

The input-to-hidden weights were initialized randomly in the interval $$-\frac{1}{\sqrt{(d)}} \langle \alpha_{ij}^2 \langle \frac{1}{\sqrt{(d)}}.$$

On the development data, hidden layers with 50 units and η=0.01, produced fast training and stable results. These values were fixed on all experiments involving the multilayer model. The number of iterations was set on the development set, running a maximum of 50 iterations[2]. The baseline model has only one feature, the cosine similarity between the ad and the query with tf-idf weights. In practice since a bias term exists in each type of classifier, effectively two features exist.

Table 4 shows the results for classification, ranking, and multilayer regression for each of the five test sets concatenated. That is for the 5 test fold evaluated as one dataset, in order to compute the significance of the mean reciprocal rank results. For mean reciprocal rank, a paired t-test was used. Results indicated with a star are significant at least the p<0.05 level with respect to the baseline. Most of the significant results are significant at the p<0.01 level with respect to the baseline. The precision at one results were not tested for statistical significance. The standard deviation for this metric is not computed because it is not well-defined for binary data.

It can be seen that multilayer regression outperforms both classification and ranking. Further, the correlation features are a significant improvement over the other models. For one third of the examples in the evaluation, the predictor correctly identifies that the first result was clicked, and an MRR of 0.60 indicates that on average the clicked result was between rank one and rank two.

The averages and standard deviation across the five test sets were also computed, see Table 5. As indicated by the standard deviation for the trials, the method is robust to changes in the data set, even for precision at 1 which is in general a much less stable evaluation metric. As already shown for content match information to prefer one over the other in case of disagreements. Thus it finds a better solution just by trusting always one over the other. The non-linear model instead has enough expressive power to capture subtler interactions between features and achieves the best results making use of both features. Another interesting aspect is the fact that, although there are only two possible rankings, and thus the problem really boils down to a binary classification task, the linear ranking perceptron clearly outperforms the simpler classifier. The difference seems to lie in the way training is performed, by considering pairwise of patterns. In terms of the features, even the simple word overlap features produced statistically significant results over the baseline model.

TABLE 4

| Feature set | Classification | | Ranking | | Regression | |
| --- | --- | --- | --- | --- | --- | --- |
| | Prec at 1 | MRR | Prec at 1 | MRR | Prec at 1 | MRR |
| B | 0.322 | 0.582 ± 0.306 | 0.333 | 0.590 ± 0.307 | 0.328 | 0.585 ± 0.307 |
| B + O | 0.319 | 0.578* ± 0.306 | 0.352 | 0.602* ± 0.310 | 0.343 | 0.596* ± 0.309 |
| B + F | 0.341 | 0.593* ± 0.309 | 0.347 | 0.597* ± 0.310 | 0.374 | 0.615* ± 0.314 |
| B + F + O | 0.357 | 0.605* ± 0.311 | 0.357 | 0.605* ± 0.311 | 0.371 | 0.614* ± 0.313 |
| B + F + O + P | 0.357 | 0.604* ± 0.311 | 0.359 | 0.606* ± 0.311 | 0.374 | 0.617* ± 0.313 |
| B + F + O + C | 0.357 | 0.601*† ± 0.310 | 0.364 | **0.610*† ± 0.311** | 0.381 | 0.619*† ± 0.315 |
| B + F + P + C + P | 0.360 | **0.606* ± 0.311** | 0.363 | 0.609* ± 0.311 | 0.388 | **0.624*† ± 0.315** |

TABLE 5

| Feature set | Classification | | Ranking | | Regression | |
| --- | --- | --- | --- | --- | --- | --- |
| | Prec at 1 | MRR | Prec at 1 | MRR | Prec at 1 | MRR |
| B | 0.322 ± 0.008 | 0.582 ± 0.003 | 0.333 ± 0.014 | 0.590 ± 0.006 | 0.331 ± 0.020 | 0.586 ± 0.012 |
| B + O | 0.339 ± 0.020 | 0.591 ± 0.012 | 0.352 ± 0.010 | 0.602 ± 0.005 | 0.343 ± 0.017 | 0.595 ± 0.011 |
| B + F | 0.340 ± 0.016 | 0.592 ± 0.007 | 0.345 ± 0.007 | 0.596 ± 0.004 | 0.368 ± 0.013 | 0.611 ± 0.007 |
| B + F + O | 0.356 ± 0.007 | 0.604 ± 0.004 | 0.359 ± 0.006 | 0.605 ± 0.003 | 0.375 ± 0.016 | 0.616 ± 0.008 |
| B + F + O + P | 0.359 ± 0.008 | 0.606 ± 0.005 | 0.361 ± 0.010 | 0.607 ± 0.007 | 0.375 ± 0.015 | 0.614 ± 0.008 |
| B + F + O + C | 0.350 ± 0.011 | 0.600 ± 0.009 | 0.365 ± 0.007 | 0.611 ± 0.003 | 0.381 ± 0.010 | 0.619 ± 0.005 |
| B + F + P + C + P | 0357 ± 0.014 | 0.605 ± 0.008 | 0.363 ± 0.006 | 0.609 ± 0.003 | 0.387 ± 0.009 | 0.622 ± 0.004 | weighting the similarity of each component separately and adding features about the degree of overlapping between query and ad improve significantly over the baseline. The best result for each model are achieved by adding the term correlation features.

Sponsored search click data is noisy, possibly more than search clicks. People and fraudulent software might click on ads for reasons that have nothing to do with topical similarity or relevance. While it is not obvious that relevant ads can be distinguished from non-relevant ads based on a user click, the results establish there is enough signal in the clicks that, with a simple method for unbiasing the rank of the click, it is possible to learn and carry out meaningful evaluation without the need for manually produced editorial judgments or complex estimation of click-through rates. Arguably, evaluating a classifier on the task of identifying the ad which will be clicked is more directly related to the task of successfully ranking ads then guessing indirectly the relevance assigned by humans.

The non-linear multilayer perceptron outperforms both the simplest linear models. Interestingly, both linear models perform better when using when using only one of the correlation features (PMI or chi-squared) rather than both, see Table 5. This might depend on the fact that the features are strongly correlated and the linear classifier does not posses enough Since ad candidates are retrieved by a retrieval system which is treat as a black box, candidates are biased by the initial ad placement algorithm, and it is possible that the initial retrieval system preferred ads with a high degree of lexical overlap with the query, and the word overlap features provided a filter for those ads. The correlation features, which capture related terms rather than matching terms, added a significant amount of discriminative information. Such features are particularly promising because they are effectively language-independent and knowledge free. Similar statistics can be extracted from many resources simple to compile, or even generated by a search engine. Overall, these findings suggest both that relevant ads contain words related to the query and that related terms can be captured efficiently with correlation measures, such as pointwise mutual information and the chi-squared statistic. There are several opportunities for further investigation of this type of features, for example by machine translation modeling.

One limitation of the current way of modeling click data is that "relevance" judgments induced by the logs are strictly binary. For example, using pairwise information is useful in training and it would be desirable to generate more complex multi-valued feedback.

Sponsored search can be thought of as a document retrieval problem, where the ads are the "documents" to be retrieved given a query. As a retrieval problem, sponsored search is difficult because ad materials contain very few terms. Because the language of the ads is so sparse, the vocabulary mismatch problem is even more difficult. In previous approaches, the problem of vocabulary mismatch by generating multiple rewrites of queries to incorporate related terms. In those systems, related terms are derived from user sessions in the query logs, where query rewrites have been identified. The set of possible rewrites is constrained to contain only terms that are found in the database of advertising keywords. They use a machine-learned ranking to determine the most relevant rewrite to match against the ads. In a follow on to this work, active learning has been implemented to select the examples to use in training machine-learned ranking. Both systems were evaluated on manual editorial judgments. By contrast the described method uses click data both for training and evaluating the system. Furthermore, the described models learn a ranking over the ads given a query directly, rather than learning a ranking over query rewrites.

Advertisements are represented in part by their keywords. In one model of online advertising, ads are matched to queries based on the keywords, and advertisers bid for the right to use the keywords to represent their product. So a related task is keyword suggestion, which can be applied to sponsored search or to its sister technology, contextual advertising, which places an ad in a web page based on the similarity between the ad and the web page content.

Contextual advertising is a sister technology to sponsored search, and many of the techniques used to place ads in web pages may be used to place ads in response to a user's query. As with sponsored search, contextual advertising is usually a pay-per-click model, and the ad representations are similar in both sponsored search and contextual advertising. The primary difference is that rather than matching an ad to a query, the system matches the ad to a web page.

Contextual advertising also suffers from the vocabulary mismatch problem. Key differences between contextual advertising methods and the method described in this application include the use of click data in place of human edited relevance judgments (both for learning a ranking function and for evaluation), the application to sponsored search rather than content match, and the use of several different type of classifiers.

The system and methods perform sponsored search ranking based on word overlap and correlation features. Based on empirical data, the method produces consistent results across different learning models, of varying complexity, and across different feature representations. In addition the method may beneficially learn on pairs of patterns and utilize multilayer regression to provide a competitive platform for ranking from noisy data and compact feature representations. The system includes simple and efficient semantic correlation features provide a valuable source of discriminative information in a complex task such as sponsored search, and thus might possibly useful also in document retrieval and search in general.

Dedicated hardware implementations, such as application specific integrated circuits, programmable logic arrays and other hardware devices, can be constructed to implement one or more of the methods described herein. Applications that may include the apparatus and systems can broadly include a variety of electronic and computer systems. One or more implementations described herein may use two or more specific interconnected hardware modules or devices with related control and data signals that can be communicated between and through the modules, or as portions of an application-specific integrated circuit. Accordingly, the present system encompasses software, firmware, and hardware implementations.

In accordance with various implementations of the present disclosure, the methods described herein may be implemented by software programs executable by a computer system. Further, in another non-limiting example, implementations can include distributed processing, component/object distributed processing, and parallel processing. Alternatively, virtual computer system processing can be constructed to implement one or more of the methods or functionality as described herein.

Further the methods described herein may be implemented in a computer-readable medium. The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

The above description is meant as an illustration of the principles of this application. This description is not intended to limit the scope of this application in that the system is susceptible to modification, variation and change, without departing from spirit of this application, as defined in the following claims.

We claim:

1. A system for ranking sponsored results, the system comprising:
a server configured to receive a query;
an advertisement engine configured to receive the query from the server, the advertisement engine ranking an advertisement of a plurality of advertisements based on a plurality of features, the advertisement engine calculating at least one word overlap feature between each advertisement and the query, wherein the plurality of features include at least one word overlap feature and a correlation feature; and
wherein the at least one word overlap feature includes a first feature that identifies whether all terms of the query are present in the advertisement, a second feature that identifies whether some of the terms of the query are present in the advertisement, a third feature that identifies whether none of the terms of the query are present in the advertisement, and a fourth feature that identifies a percentage of terms of the query present in the advertisement.

2. The system according to claim 1, wherein the correlation feature comprises a Chi-squared characteristic.

3. The system according to claim 2, wherein the Chi-squared characteristic is calculated according to the relationship:

$$x^2 = \frac{|L|(o_{11}o_{22} - o_{12}o_{21})^2}{(o_{11} + o_{12})(o_{11} + o_{21})(o_{12} + o_{22})(o_{21} + o_{22})}$$

where $|L|$ is the number of queries in a query log, $o_{11}$ stands for a first number of queries in the query log, which contain both $t_1$ and $t_2$, $o_{12}$ stands for a second number of queries in the query log, in which $t_2$ occurs but $t_1$ does not, $o_{21}$ stands for a third number of queries in the query log, in which $t_1$ occurs but $t_2$ does not, $o_{22}$ stands for a fourth number of queries in the query log, in which neither $t_1$ or $t_2$ occur.

4. The system according to claim 1, wherein the correlation feature comprises a pointwise mutual information characteristic.

5. The system according to claim 4, wherein the pointwise mutual information characteristic is calculated according to the relationship:

$$PMI(t_1, t_2) = \log_2 \frac{P(t_1, t_2)}{P(t_1)P(t_2)}$$

where $t_1$ is a term from the query, and $t_2$ is a bidded term from the advertisement, $P(t)$ is the probability that term t appears in the query, and $P(t_1, t_2)$ is the probability that terms $t_1$ and $t_2$ occur in the query.

6. A method for ranking results, the method comprising:
receiving a query;
accessing a plurality of elements to be ranked;
calculating at least one word overlap feature between each element and the query, wherein the at least one word overlap feature includes a first feature that identifies whether all terms of the query are present in an element, a second feature that identifies whether some of the terms of the query are present in the element, a third feature that identifies whether none of the terms of the query are present in the advertisement, and a fourth feature that identifies a percentage of terms of the query present in the element, the word overlap feature being calculated on a computer;
calculating a correlation feature between each element and the query; and
ranking each element of the plurality of elements based on the word overlap feature and the correlation feature.

7. The method according to claim 6, wherein the correlation feature comprises a Chi-squared characteristic.

8. The method according to claim 7, wherein the Chi-squared characteristic is calculated according to the relationship:

$$x^2 = \frac{|L|(o_{11}o_{22} - o_{12}o_{21})^2}{(o_{11} + o_{12})(o_{11} + o_{21})(o_{12} + o_{22})(o_{21} + o_{22})}$$

where $|L|$ is the number of queries in a query log, $o_{11}$ stands for a first number of queries in the query log, which contain both $t_1$ and $t_2$, $o_{12}$ stands for a second number of queries in the query log, in which $t_2$ occurs but $t_1$ does not, $o_{21}$ stands for a third number of queries in the query log, in which $t_1$ occurs but $t_2$ does not, $o_{22}$ stands for a fourth number of queries in the query log, in which neither $t_1$ or $t_2$ occur.

9. The method according to claim 6, wherein the correlation feature comprises a pointwise mutual information characteristic.

10. The method according to claim 9, wherein the pointwise mutual information characteristic is calculated according to the relationship:

$$PMI(t_1, t_2) = \log_2 \frac{P(t_1, t_2)}{P(t_1)P(t_2)}$$

where $t_1$ is a term from the query, and $t_2$ is a bidded term from an ad, $P(t)$ is the probability that term t appears in the query, and $P(t_1, t_2)$ is the probability that terms $t_1$ and $t_2$ occur in the query.

11. A non-transitory computer readable medium having stored therein instructions executable by a programmed processor for ranking results, the non-transitory computer readable medium comprising instructions for:
receiving a query;
accessing a plurality of elements to be ranked;
calculating at least one word overlap feature between each element and the query, wherein the at least one word overlap feature includes a first feature that identifies whether all terms of the query are present in an element, a second feature that identifies whether some of the terms of the query are present in the element, a third feature that identifies whether none of the terms of the query are present in the element, and a fourth feature that identifies a percentage of terms of the query present in the element;
calculating a correlation feature between each element and the query; and
ranking each element of the plurality of elements based on the word overlap feature and the correlation feature.

12. The computer readable medium according to claim 11, wherein the correlation feature comprises a Chi-squared characteristic calculated according to the relationship:

$$x^2 = \frac{|L|(o_{11}o_{22} - o_{12}o_{21})^2}{(o_{11} + o_{12})(o_{11} + o_{21})(o_{12} + o_{22})(o_{21} + o_{22})}$$

where $|L|$ is the number of queries in a query log, $o_{11}$ stands for a first number of queries in the query log, which contain both $t_1$ and $t_2$, $o_{12}$ stands for a second number of queries in the query log, in which $t_2$ occurs but $t_1$ does not, $o_{21}$ stands for a third number of queries in the query log, in which $t_1$ occurs but $t_2$ does not, $o_{22}$ stands for a fourth number of queries in the query log, in which neither $t_1$ or $t_2$ occur.

13. The computer readable medium according to claim 11, wherein the correlation feature comprises a pointwise mutual information characteristic calculated according to the relationship:

$$PMI(t_1, t_2) = \log_2 \frac{P(t_1, t_2)}{P(t_1)P(t_2)}$$

where $t_1$ is a term from the query, and $t_2$ is a bidded term from an ad, $P(t)$ is the probability that term t appears in the query, and $P(t_1, t_2)$ is the probability that terms $t_1$ and $t_2$ occur in the query.

14. A system for ranking sponsored results, the system comprising:
a server configured to receive a query;
an advertisement engine configured to receive the query from the server, the advertisement engine ranking an advertisement of a plurality of advertisements based on a plurality of features, the advertisement engine calculating at least one word overlap feature between each advertisement and the query, wherein the plurality of features include at least one word overlap feature and a correlation feature; and
wherein the at the correlation feature is calculated based on a query term and a bid term, where the correlation feature is further calculated based on a first number of queries in the query log, which contain both the query term and the bid term, a second number of queries in the query log, in which the bid term occurs but the query term does not, a third number of queries in the query log, in which the query term occurs but the bid term does not, and a fourth number of queries in the query log, in which neither the bid term or the query term occur.

15. A system for ranking sponsored results, the system comprising:

a server configured to receive a query;

an advertisement engine configured to receive the query from the server, the advertisement engine ranking an advertisement of a plurality of advertisements based on a plurality of features, the advertisement engine calculating at least one word overlap feature between each advertisement and the query, wherein the plurality of features include at least one word overlap feature and a correlation feature; and wherein the at the correlation feature is calculated based on a query term and a bid term, where the correlation feature is further calculated based on a probability function of whether the query term and the bid term occur in the same query.

\* \* \* \* \*